United States Patent [19]

Choi

[11] Patent Number: 5,335,007
[45] Date of Patent: Aug. 2, 1994

[54] BEAM SCANNING DEVICE FOR AN ELECTRONIC PHOTOGRAPHY TYPE PRINTER

[75] Inventor: Hoon B. Choi, Seoul, Rep. of Korea

[73] Assignee: Goldstar Co., Ltd., Seoul, Rep. of Korea

[21] Appl. No.: 736,769

[22] Filed: Jul. 29, 1992

[30] Foreign Application Priority Data

Jul. 31, 1990 [KR] Rep. of Korea ............... 11349/1990

[51] Int. Cl.$^5$ .................. G01D 15/14; H04N 1/29; H01J 5/16
[52] U.S. Cl. ................ 346/107 R; 346/160; 346/139 R; 358/302; 358/495; 250/236
[58] Field of Search .............. 346/107 R, 108, 160, 346/139 R; 358/300, 302, 495; 359/232, 234, 235; 250/578.1, 234, 235, 236

[56] References Cited

U.S. PATENT DOCUMENTS

| | | | |
|---|---|---|---|
| 562,834 | 6/1896 | Knauss et al. | 346/107 R |
| 2,167,460 | 7/1939 | Mathes | 358/302 |
| 2,548,783 | 4/1951 | Goldsmith | 250/236 X |
| 2,693,992 | 11/1954 | Young et al. | 346/139 R X |
| 2,765,211 | 10/1956 | Brinster et al. | 346/107 R |
| 3,138,427 | 6/1964 | Stein et al. | 346/139 R X |
| 3,313,960 | 4/1967 | Borys | 361/77 |
| 3,344,722 | 10/1967 | Cunningwell | 346/107 R X |
| 3,656,175 | 4/1972 | Carlson et al. | 346/108 X |
| 4,002,456 | 1/1977 | Miner et al. | 307/142 X |
| 4,002,956 | 1/1971 | Minoi et al. | 317/154 |
| 4,357,619 | 11/1982 | Klockenbrink | 346/160 |
| 4,871,924 | 10/1989 | Seuaki | 307/125 |
| 5,029,037 | 7/1991 | Bartelink | 361/49 |

FOREIGN PATENT DOCUMENTS 3707307 9/1988 Fed. Rep. of Germany.

*Primary Examiner*—Benjamin R. Fuller
*Assistant Examiner*—David Yockey
*Attorney, Agent, or Firm*—Rosen, Dainow & Jacobs

[57] ABSTRACT

A scanning device for an electronic photography printer which comprises a photosensitive drum, a rotary cylinder horizontally disposed and provided with spiral slits which are spaced from one another, an LED array horizontally penetrating the inside of the rotary cylinder and having a plurality of LEDs which are disposed on the LED array and each having a width of the same distance as the space between respective spiral slits of the rotary cylinder, a horizontal slit plate disposed between the photosensitive drum and the rotary cylinder and having a plurality of slits which are inclined on the basis of the horizontal line of the horizontal slit plate and spaced from one another, and a self-focus lens array horizontally disposed between the photosensitive drum and the horizontal slit plate.

5 Claims, 2 Drawing Sheets

BEAM SCANNING DEVICE FOR AN ELECTRONIC PHOTOGRAPHY TYPE PRINTER

BACKGROUND OF THE INVENTION

The present invention relates to a scanning device for an electronic photography type printer, and more particularly to an LED beam scanning device for a low speed electronic photography type printer, which scans an LED beam of an LED array to a desired position of the photosensitive drum by virtue of relative rotation of a rotary cylinder provided with spiral slits to a fixed horizontal slit plate provided with longitudinal slits.

Conventionally, known scanning device of an electronic photography type printer can be classified into various types, laser scanner type, hologram scanner type, LED (light emitting diode) array type, LSC (liquid crystal shutter) type and the like. Among these types of scanning devices, the laser scanner type of scanning device has been widely used due to its fast printing speed and good printing result.

FIG. 1 is a perspective view showing a representative embodiment of a known laser scanner type of scanning device. As illustrated, the laser scanner type of scanning device comprises a laser diode 1 as a light source, a light source drive circuit 1' for driving the laser diode 1, a collimating lens 2 and a cylindrical lens 3, each for condensing the light beam having emitted from the laser diode 1, a polygon mirror 4 for reflecting the condensed beam, a drive motor and circuit assembly 5 for driving the polygon mirror 4 f-$\theta$ lens system 6, a photosensitive drum 11 disposed before and lower than the f-$\theta$ lens system 6, a totally reflecting mirror 7 disposeed at an inclination angle of 45° between the f-$\theta$ lens system 6 and the photosensitive drum 11. Also, this scanning device is provided with a sensing beam reflecting mirror 8 disposed between the f-$\theta$ lens system 6 and the reflecting mirror 7, a beam sensing circuit 9 for sensing the reflected beam from the sensing beam reflecting mirror 8, an optical fiber 10 connected to the beam sensing circuit 9 for receiving and transferring the reflected beam. Here, the f-$\theta$ where lens system 6 satisfies the formulation $\delta Z = f \cdot \theta$ ($\delta Z$ is the desired scanned position of the photosensitive drum 11, f is the effective focal distance, and $\theta$ is the scanning angle, that is the rotational angle of the polygon mirror 4) and comprises two lenses each having two bent surfaces with different respective radii of curvature.

In operation, the laser beam emitted from the laser diode 1 driven by virtue of the driving signal of the light source drive circuit 1' is condensed onto the polygon mirror 4 by way of the collimating lens 2 and the cylindrical lens 3. The polygon mirror 4 generally comprises a hexagon mirror body and rotates clockwise by the drive motor and circuit assembly 5. The laser beam having been condensed to the polygon mirror 4 is reflected to the f-$\theta$ lens system 6 wherein the effective focal distance f and the scanning angle $\theta$ of the laser beam are compensated, thereafter, the laser beam is scanned to the totally reflecting mirror 7. At this reflecting mirror 7, the laser beam is reflected at 90° angle and then scanned to the photosensitive drum 11 with the effective focal distance and the constant scanning speed, thereby printing a desired image. Also, a part of the laser beam transmitted through the f-$\theta$ lens system 6 is reflected by the sensing beam reflecting mirror 8 so as to directed to the optical fiber 10, wherefrom the beam is transferred to the sensing circuit 9. The sensing circuit 9 determines the initial scanning position of the laser beam by analyzing said laser beam.

At this time, the scanning speed of the laser beam is constant, so that it is possible to scan the laser beam to a desired position of the photosensitive drum 11 by turning on the laser diode 1 after a predetermined time since the beam sensing circuit 9 determined the initial scanning position.

This type of scanning device has relatively good effect in printing speed and printing result. However, the scanning device has several disadvantages in that it includes several lenses, such as the collimating lens 2 and the cylindrical lens 3 each adapted for condensing the laser beam onto the polygon mirror 4, and the f-$\theta$ lens system 6 adapted for controlling the f-$\theta$ characteristics of the laser beam, thereby causing the scanning device to be complex and also it needs to provide an effective focal distance between the polygon mirror 4 and the photosensitive drum 11, so that compactness of the scanning device can not be accomplished. Furthermore, this type of scanning device has another disadvantage in that even minute error of each lens results in a serious error of the photosensitive drum 11 so that each said lens has to be machined in high accuracy, thereby causing the cost of the printer to be higher as a result of the high manufacturing cost of each lens.

SUMMARY OF THE INVENTION

It is, therefore, an object of the present invention to provide a compact scanning device for an electronic photography type printer in which the above disadvantages can be overcome and which can control the scanning position of LED beams by displacement of the relative position of a rotary cylinder to a horizontal slit plate, said horizontal slit plate having a plurality of longitudinal slits and said rotary cylinder allowing an LED array to extend through the center thereof and having a plurality of spiral slits formed on the circumferential surface thereof and spaced spart from each other.

The above mentioned object of the present invention can be accomplished by providing a scanning device for an electronic photography type printer comprising: a photosensitive drum; a rotary cylinder horizontally disposed and provided with spiral slits, said spiral slits being cut on the circumferential surface thereof and spaced a distance apart from one another; an LED array horizontally penetrating the inside of the rotary cylinder and having a plurality of LEDs, said LEDs respectively disposed on the LED array and having a width of the same distance as the space between respective spiral slits of the rotary cylinder; a horizontal slit plate disposed between the photosensitive drum and the rotary cylinder and having a plurality of slits, said slits being inclined on the basis of the horizontal line of the horizontal slit plate and spaced from one another; and a self-focus lens array horizontally disposed between the photosensitive drum and the horizontal slit plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
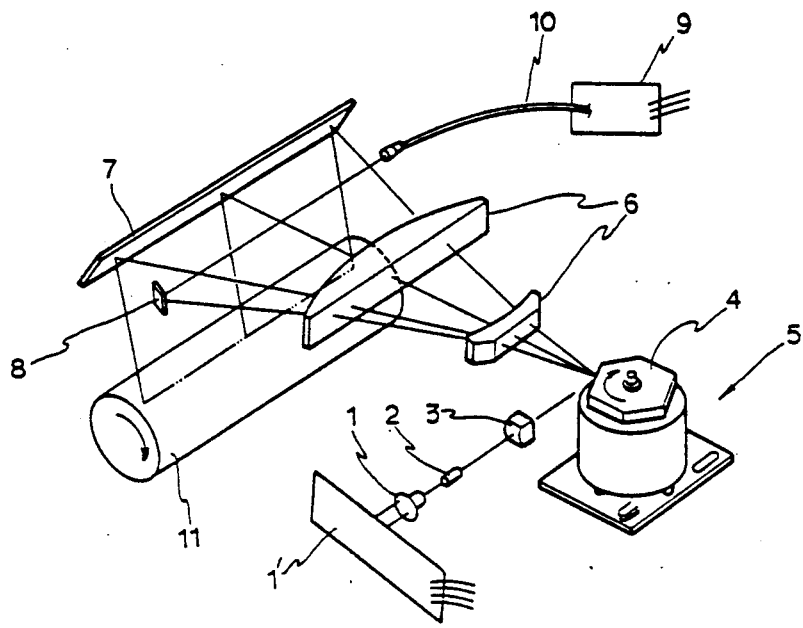
FIG. 1 is a perspective view showing a known scanning device of a laser scanner type of printer.
Figure 2:
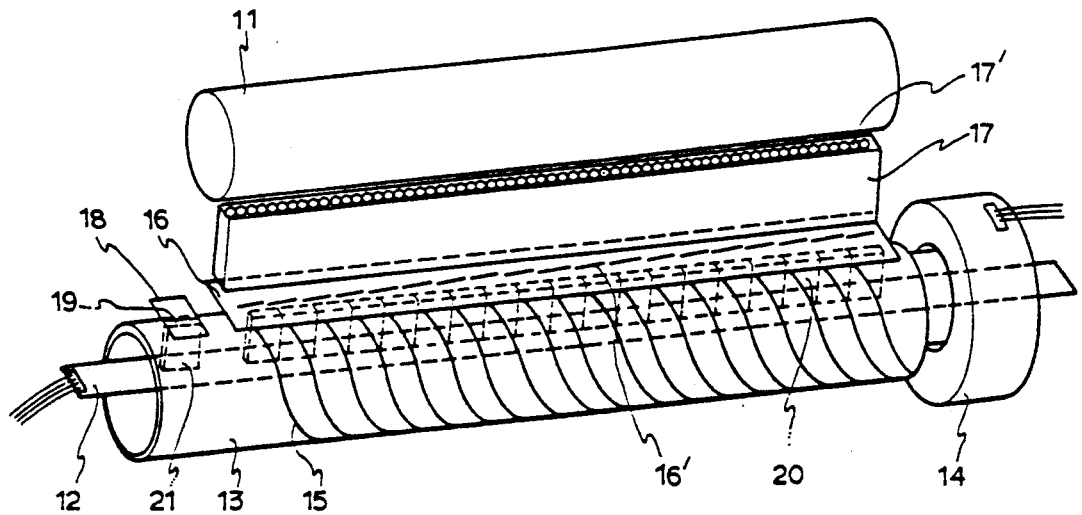
FIG. 2 is a perspective view showing a scanning device for an electronic photography type printer in accordance with the present invention.
Figure 3:
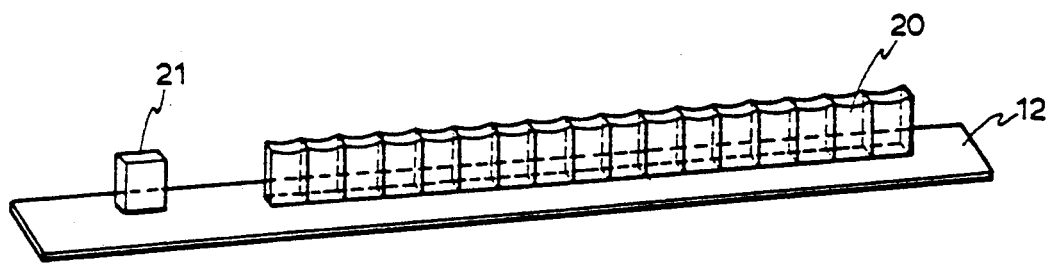
FIG. 3 is an enlarged perspective view showing the LED array of the scanning device of FIG. 2.
Figure 4:
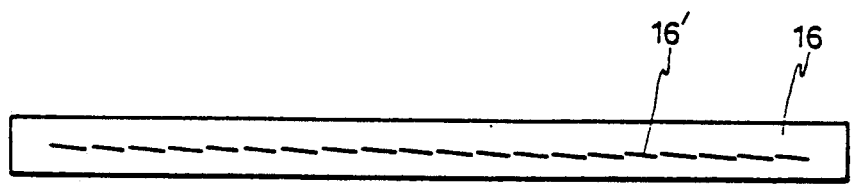
FIG. 4 is a schematic plan view showing the horizontal slit plate of the scanning device of FIG. 2.

Referring now to FIGS. 2 to 4 in which FIG. 2 is a perspective view showing a scanning device for an electronic photography type printer in accordance with the present invention, FIG. 3 is an enlarged perspective view showing the LED array of the scanning device and FIG. 4 is a schematic plan view showing the horizontal slit plate of the scanning device, this scanning device comprises a horizontally disposed photosensitive drum 11 rotatably mounted to a mounting bracket (not shown) of the printer, a rotary cylinder 13 provided with a plurality of spiral slits 15, said spiral slits 15 respectively formed as cut on the circumferential surface of said rotary cylinder 13 and spaced from each other. The rotary cylinder 13 allows the LED array 12 to extend horizontally through the hollow inside thereof. The rotary cylinder 13 is connected to a drive motor 14 for driving said rotary cylinder 13. A horizontal slit plate 16 is disposed on the rotary cylinder 13 and provided with a plurality of longitudinally formed slits 16'. Horizontally disposed between the photosensitive drum 11 and the horizontal slit plate 16 is a self-focus lens array 17 (hereinafter, referred to simply as "the SLA") having a plurality of self-focus lenses 17', the SLA 17 is spaced from the horizontal slit plate 16. Here, the LED array 12, the rotary cylinder 13, the horizontal slit plate 16, the SLA 17 and the photosensitive drum 11 are parallel with one another.

As above described, the LED array 12 is provided with a plurality of LEDs 20 disposed in a line with a space between respective LEDs 20, each LED 20 has a concave lens surface at its upper surface so as to equalize the distribution of the light during light emission thereof. Also, a light absorber is applied between respective LEDs 20, thereby preventing the interference which may occur between respective LEDs 20. The LED array 16 is also provided with a sensing LED 21 disposed at a portion spaced from the LEDs 20, said sensing LED 21 sensing the initial scanning position (see FIG. 3).

The rotary cylinder 13 is provided with a plurality of spiral slits 15 which are provided with a spiral space between adjacent two spiral slits 15. Each spiral space has the same width as that of each LED 20 and each slit 15 has a width of about 50–80 μm. A sensing slit 19 is formed at a position of the rotary cylinder 13 corresponding to the mounting position of the sensing LED 21 of the LED array 12, thereby making it possible to determine the initial scanning position of the LED beams. Also, this rotary cylinder 13 is connected at an end opposite to the sensing slit 19 to the drive motor 14 which drives said rotary cylinder 13 in a constant rotational velocity. The cylinder 13 has a hollow center opening through which the LED array 12 extends. Here, the LED array 12 is fixed, while the rotary cylinder 13 rotates by virtue of the drive motor 14, thereby causing the relative position of each spiral slit 15 of the rotary cylinder 13 to each LED 20 of the LED array 12 to move in accordance with the rotation of the rotary cylinder 13.

The horizontal slit plate 16 is horizontally disposed on the rotary cylinder 13 and provided with a plurality of longitudinal slits 16' therein cut. As shown in FIG. 4, each longitudinal slit 16' is inclined, so that the rear end of each slit 16' is not aligned with the front end of adjacent another slit 16'. The vertical distance from the front end to the rear end of each slit 16' is equal to the rotational distance of the photosensitive drum 11 in a rotation of the rotary cylinder 13, thereby causing the LED beams to be scanned in a straight line from the LED array 12 to the photosensitive drum 11. The number of the longitudinal slits 16' is the same as that of the spiral slits 15 of the rotary cylinder 13.

Also, an initial scanning position sensor 18 for determining the initial scanning position of LED beams is disposed on the sensing slit 19 of the rotary cylinder 13. Therefore, the sensor 18 determines the initial scanning position of the LED beams as it senses the LED beam emitted from the sensing LED 21 of the LED array 12 when the sensing slit 19 is aligned with the sensing LED 21 as a result of the rotation of the rotary cylinder 13, the sensing LED 21 always emits a beam. At the initial scanning position, each spiral slit 15 and each corresponding longitudinal slit 16' cross one another at the front end of each longitudinal slit 16', and a cross hole is provided at that end of each longitudinal slit 16'. Also, each cross hole provided by crossing of the spiral and longitudinal slits 15 and 16' moves from the front end of the longitudinal slit 16' toward the rear end of said longitudinal slit 16' as the rotary cylinder 13 rotates since the initial scanning position of the LED beams has been determined. The moving cycle of the slit crossing is equal to the rotating cycle of the rotary cylinder 13.

The SLA 17 adjusts the focal distance of the LED beams passed through the cross hole and scans the adjusted LED beam to the photosensitive drum 11.

The operational effect of the scanning device of this invention will be described hereinafter.

As the rotary cylinder 13 rotates by virtue of the drive motor 14, the sensing slit 19 of the rotary cylinder 13 will be temporarily aligned with the sensing LED 21 of the LED array 12. At that time, the initial position sensor 18 determines the initial scanning position of LED beams by sensing the LED beam from the sensing LED 21 which always emits light as described above. Here, the cross hole provided by crossing of the spiral slits 15 and the longitudinal slits 16' is, as described above, provided at the front end of each longitudinal slit 16' and the displacement of the relative position of the spiral slit 15 to the longitudinal slit 16' can be previously calculated on the basis of the constant rotational velocity of the rotary cylinder 13. Thus, if the LEDs 20 are turned on at a time after the initial scanning position sensor 18 has determined the initial scanning position of LED beams, the LEDs 20 emit a beams, respectively, thereby causing the LED beams to be scanned to the SLA 17 through each cross hole. The SLA 17 adjusts the focal distance of the LED beams and scans the LED beams to the desired position of the photosensitive drum 11.

As described above, the scanning device for an electronic photography type printer in accordance with this invention has advantages in that it scans LED beams to the desired position of the photosensitive drum by virtue of the LED array, the rotary cylinder provided with a plurality of spiral slits and the horizontal slit plate, and it does not need a long focal distance, thereby reducing the manufacturing cost as a result of removing the expensive lenses, and accomplishing the compactness of the printer.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A scanning device for an electronic photography printer comprising:

a photosensitive drum a horizontal rotary cylinder having a circumferential surface and a plurality of spiral slits cut on said surface, said slits being axially spaced from one another along said cylinder;

a horizontal LED array extending inside of the rotary cylinder, said array having a plurality of LEDs, said LEDs being disposed on the LED array and having widths equal to the axial spacing between adjacent ones of said spiral slits of the rotary cylinder;

a horizontal slit plate disposed between the photosensitive drum and the rotary cylinder and having a plurality of longitudinally aligned slits, said slits of said slit plate being inclined with respect to a horizontal line of the horizontal slit plate and axially spaced from one another; and a self-focus lens array horizontally disposed between the photosensitive drum and the horizontal slit plate.

2. A scanning device for an electronic photography printer according to claim 1, wherein said scanning device further comprises a sensing LED mounted on said LED array at a position spaced from said LEDs, a sensing slit cut on said rotary cylinder at a position corresponding to said sensing LED, and an initial scanning position sensor positioned over said sensing slit of the rotary cylinder.

3. A scanning device for an electronic photography printer according to claim 1, wherein a width of each of said spiral slits of the rotary cylinder is from 50-80 μm.

4. A scanning device for an electronic photography printer according to claim 2, wherein said rotary cylinder and said horizontal slit plate are so arranged that a cross hole formed by crossing each spiral slit of said rotary cylinder and each slit of said horizontal slit plate is positioned at an end of each said longitudinal slit when said initial scanning position sensor determines an initial scanning position of a beam from said sensing LED.

5. A scanning device for an electronic photography printer according to claim 1, wherein each of said LEDs has a concave lens surface at an upper surface thereof and further comprising a light absorber between each pair of adjacent LEDs.

* * * * *